United States Patent [19]

Dann et al.

[11] 3,855,410

[45] Dec. 17, 1974

[54] METHOD FOR THE PRODUCTION AND ISOLATION OF ANTIBIOTIC AV290 SULFATE

[75] Inventors: Murray Dann; Joseph Daniel Korshalla, both of Pearl River; Ping Shu, Pomona, all of N.Y.

[73] Assignee: American Cyanamid Company, Stamford, Conn.

[22] Filed: May 4, 1972

[21] Appl. No.: 250,222

[52] U.S. Cl. ............................................... 424/124
[51] Int. Cl. ............................................. A61k 21/00
[58] Field of Search ................................... 424/124

[56] References Cited

UNITED STATES PATENTS

| | | | |
|---|---|---|---|
| 3,338,786 | 8/1967 | Kunstmann et al. | 424/118 |
| 3,651,216 | 3/1972 | Ringel et al. | 424/124 |

*Primary Examiner*—Jerome D. Goldberg
*Attorney, Agent, or Firm*—Edward A. Conroy, Jr.

[57] ABSTRACT

This disclosure describes a multistep process for recovering highly purified antibiotic AV290 from a fermentation whole harvest mash obtained by the cultivation under controlled conditions of *Streptomyces candidus* NRRL 3218 and mutants thereof.

4 Claims, No Drawings

METHOD FOR THE PRODUCTION AND ISOLATION OF ANTIBIOTIC AV290 SULFATE

BRIEF SUMMARY OF THE INVENTION

This invention relates to a method of recovering highly purified antibiotic AV290 from fermentation whole harvest mashes containing it. More particularly, the process involves removal of the mycelia by filtration, followed by ion exchange chromatography on carboxymethyl substituted cross-linked dextran gel grains, and finally adsorption chromatography on granular activated carbon. Highly purified antibiotic AV290 is then recovered from the final eluate by any convenient means.

DETAILED DESCRIPTION OF THE INVENTION

Antibiotic AV290 is formed by fermentative biosynthesis during the cultivation under controlled conditions of *Streptomyces candidus* NRRL 3218 and mutants thereof. The preparation and properties of antibiotic AV290 are set forth in U.S. Pat. No. 3,338,786 which is hereby incorporated by reference. The problem of recovering the antibiotic economically in highly purified form has been a serious one. In the patent referred to above, adsorption on charcoal followed by elution and two stages of column chromatography are employed. There is, therefore, a need for an improved process of recovering the antibiotic in highly purified form for medical usage.

As starting material for the novel process of the present invention there is employed the whole harvest mash obtained after completion of a fermentation with *S. candidus* NRRL 3218, or mutants thereof. The whole harvest mash is adjusted to about pH 3 with sulfuric acid and clarified by removing the mycelia and other insolubles by filtration. Diatomaceous earth or any other conventional filtration aid such as Hyflo Supercel may be used to assist in the filtration. The filter cake is washed with water and discarded. The combined filtrate and washing is adjusted to about pH 6 with barium hydroxide and the precipitate barium sulfate is removed by filtration, preferably with a filter aid. The fermentation liquor thus prepared is then passed through a column packed with a bed of carboxymethyl substituted cross-linked dextran gel grains whereupon the antibiotic AV290 is selectively adsorbed onto the gel grains.

The carboxymethyl substituted cross-linked dextran gels suitable for the process of the present invention may be obtained by first reacting dextran having an average molecular weight within the range of from about 5,000 to about 100,000 with epichlorohydrin, which results in a copolymerisate consisting of a three-dimensional macroscopic network. This network is built up of chains of mainly alpha-1,6-glycosidically bonded glucose residues bound together by ether bridges of the type

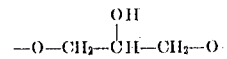

said gels having a content of hydroxyl groups of at least 15 percent of the weight of the dry gel and a water regain within the range of from about one to about 50 g./g. of the dry gel product. These gel products are ground down to a particle size within the range of from about 0.05 to about 0.50 mm., preferably to a particle size corresponding to 20 to 200 mesh according to U.S. standard mesh. These gel products are produced commercially for chromatographic use under the trade name of Sephadex G by Pharmacia Fine Chemicals, Inc., Uppsala, Sweden. The essential features of Sephadex G can be visualized from the following schematic formula:

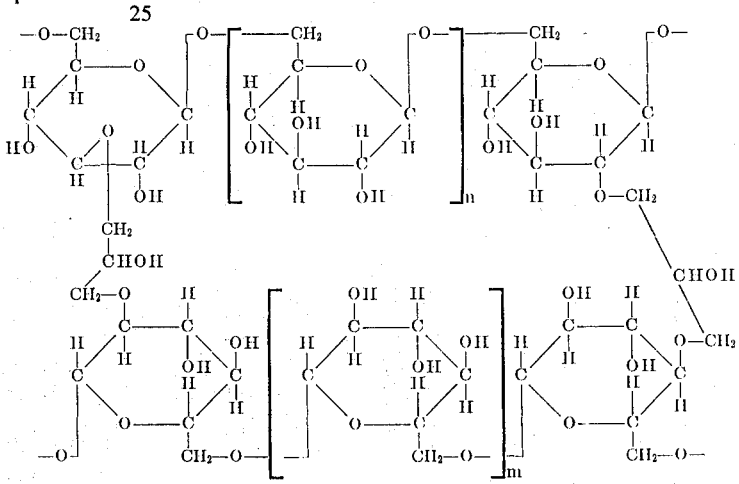

These gels are insoluble in water although capable of swelling therein and have a great stability and durability. The degree of swelling depends on the degree of cross-linkage and is characterized by the so-called water regain. This is the amount of water that is absorbed by one gram of dry gel during swelling. There are eight types of Sephadex G gels with water regain values ranging from 1 to 20 as set forth in Table I below:

TABLE I

| Type | Particle Size (dry; in μ) | Water Regain (g./g.) | Gel Bed (ml./g.) |
|---|---|---|---|
| Sephadex G-10 | 40–120 | 1.0 | 2–3 |
| Sephadex G-15 | 40–120 | 1.5 | 2.5–3.5 |
| Sephadex G-25 | 50–150 | 2.5 | 4–6 |
| Sephadex G-50 | 50–150 | 5.0 | 9–11 |
| Sephadex G-75 | 40–120 | 7.5 | 12–15 |
| Sephadex G-100 | 40–120 | 10.0 | 15–20 |
| Sephadex G-150 | 40–120 | 15.0 | 20–30 |
| Sephadex G-200 | 40–120 | 20.0 | 30–40 |

Treatment of Sephadex G-25 or G-50 types with chloroacetic acid in alkaline medium provides the carboxymethyl ether having 0.5–2.0 carboxymethyl groups per anhydroglucopyranosic unit. These carboxymethyl substituted cross-linked dextran gels are produced commercially for ion exchange use under the trade name of CM-Sephadex by Pharmacia Fine Chemicals, Inc., Uppsala, Sweden, and their properties are set forth in Table II below:

TABLE II

| Type | Fractionation range (m.w.) | Character of exchanger | Capacity (meq./g.) | Bed volume (ml./g.) |
|------|---------------------------|------------------------|--------------------|--------------------|
| CM-Sephadex C-25 | up to 10,000 | weakly acidic cation-exchanger | 4–5 | 6–10 |
| CM-Sephadex C-50 | over 10,000 | weakly acidic cation-exchanger | 4–5 | 20–40 |

The physical properties of these derivatives, and their chemical stability, are essentially those of the cross-linked dextran gel starting materials.

The preparation and properties of these carboxymethyl substituted cross-linked dextran gels are described in the following references:

U.S. Pat. No. 3,002,823 to Flodin et al., (1961).
Mikes & Chalmers, Chromatographic Methods, D. Van Nostrand Company Ltd. (1961).
Porath, Advances in Protein Chemistry, Vol. 17, Academic Press, pages 209–226 (1962).
Joustra, Protides of the Biological Fluids, Vol. 14, Elsevier Publishing Co., pages 533–541 (1966).
Determann, Gel Chromatography, Springer-Verlag New York Inc. (1968).

which are hereby incorporated by reference.

The bed of the gel grains is preferably arranged in the form of a column. The apparatus may suitably consist of a cylindrical tube supported at its lower portion by a porous disc or plate serving as support for the gel bed and provided at its upper portion with supply arrangements for a solution of the complex and for the elution liquid. The gel particles should be packed in the column as tightly as possible and in such a quantity that they take up the greatest part of the total packing volume, while the remainder of the packing volume is the so-called void volume, i.e., the total volume of the spaces between the gel grains. This packing may be attained in the following manner. The calculated quantity of gel of narrow grain size distribution is allowed to swell in water until equilibrium has been reached, and it is then stirred to form a uniform suspension. This suspension is poured into the tube which has already been partly filled with water. During the packing procedure the water is allowed to flow out of the column with uniform speed. During this procedure it can be observed that the packed bed grows from the bottom upwards with a sharp upper level above which the gel grains are in constant movement by convection. When the bed is packed, care should be taken that the upper level of the bed is as even as possible.

Following the bed packing procedure, the water remaining in the tube above the bed is allowed to flow down through the bed until the upper level of the water is about to disappear below the top of the bed. The downward flow of water is then interrupted and the fermentation liquor is carefully poured as a layer on top of the bed, whereupon the flow through the bed is again started (from this time on the liquid flowing out of the column is referred to as the "effluent") until the liquid level above the bed is about to disappear in the bed. The capacity of the carboxymethyl substituted cross-linked dextran gels to absorb the antibiotic AV290 is from about 0.1 gram to about 1.0 g. of AV290 per gram of dry gel.

Thereafter, the elution liquid, pH 1.4–2.0 aqueous sulfuric acid, is poured as a layer on top of the bed and the flow through the bed again permitted to begin. The antibiotic AV290 then appears in the effluent after appropriate exchange and is collected in one or more fractions. Preferably, a gradient system of from weaker acid elution liquid to stronger acid elution liquid within the pH range is employed. The carboxymethyl substituted cross-linked dextran gels may be used in either the hydrogen form or the sodium form but the hydrogen form is preferred. This is prepared by suspending the gel beads in water for full regain, acidifying the suspension to pH 2 with any convenient mineral acid, washing with water and then packing the beads in the column.

It is important that the rate of flow of the solution through the bed of gel grains should not be too high. It has been found that, depending on the conditions, the linear rate of flow may be as high as 10 cm./min., but it is preferably not higher than 7 cm./min. The effluent is monitored by ultraviolet absorption at 280 nm. and by a microbial agar diffusion assay method with *Corynebacterium xerosis* as the assay organism.

The fractions containing the antibiotic are pooled and concentrated under reduced pressure to about one-fifth of original volume for convenience in handling. Any insoluble material present may be removed by filtration and the pH of the filtrate is adjusted to about 6 with barium hydroxide whereupon barium sulfate precipitates. The barium sulfate is removed by any convenient means such as filtration or centrifugation.

The antibiotic activity is then adsorbed onto activated carbon or other suitable charcoal adsorbant, using about 5–10 parts by weight of the adsorbant per part of antibiotic. Colored impurities are removed from the adsorbant by washing it with water using about 20 ml. of water per gram of adsorbant. The antibiotic activity is retained on the activated charcoal. The antibiotic may be eluted from the charcoal by stirring it for about ½ hour with 40 percent aqueous acetone, using a volume of eluate equal to about one-tenth to one-quarter of the original beer volume. However, this adsorption chromatography step on granular activated carbon is preferably carried out in a column. Conveniently, this column may be akin to that employed in the ion exchange chromatography step as described hereinabove. In either case, the eluate fractions are assayed by ultraviolet absorption at 280 nm. and by bioassay, and selected fractions are combined and concentrated under reduced pressure to about one-third of the original composite volume. The pH of this concentrate is then adjusted to about 4 with sulfuric acid and the concentrate is evaporated to dryness, preferably under high vacuum, at freezing temperature to provide highly purified antibiotic AV290 sulfate. Alternatively, the antibiotic in the acidified eluate concentrate may be recovered by slowly adding the solution to 10 volumes of acetone per volume of solution with constant stirring. The precipitate is collected by filtration or centrifugation, washed with acetone, and dried in a vacuum oven at 45° C. The novel process of the present invention affords a pronounced increase in yield of antibiotic AV290 over that which may be achieved by the processes set forth in U.S. Pat. No. 3,338,786.

For a clearer understanding of the invention, specific examples of it are set forth below. These examples are merely illustrative, and are not to be understood as limiting the scope and underlying principles of the invention in any way.

EXAMPLE 1

THE FERMENTATION

A. *Streptomyces Candidus* (NRRL 3218)

Antibiotic AV290 is produced by a strain of *Streptomyces candidus*, NRRL 3218. A brown pigmented natural variant of the wild type was selected for production on the basis of high antibiotic production and stability. Such variants are described in U.S. Pat. No. 3,338,786. The variant is maintained by serial transfers on agar medium at intervals of no longer than 2 months or in a lyophilized condition.

B. Stock Agar Slants

Stock agar slants are prepared by transferring the lyophilized culture or growth from a slant into 100 ml. of medium 3-9 in a sterile 500 ml. Erlenmeyer flask. The flasks are incubated at 28° C. for 2 days on a rotary shaker operating at 180 rpm. Sterile slants in 50 ml. screw cap test tubes containing 20 ml. of yeast-malt agar are inoculated with growth from the 2-day-old seed flasks. These slants are incubated at 28° C. for 4 to 5 days and then stored at 12° C. for up to 2 months.

| Medium 3-9 | | Yeast-malt Slant Medium | |
| --- | --- | --- | --- |
| Cane molasses | 20 gm./l. | Yeast extract | 4 gm./l. |
| N-Z amine type A | 10gm./l. | Malt extract | 10 gm./l. |
| Adjust to pH 7.5–7.7 with NaOH | | Glucose | 4 gm./l. |
| | | Agar | 20 gm./l. |
| | | Adjust to pH 7.1–7.3 with NaOH | |

C. Preparation of Inoculum

First Stage

Growth from a slant is transferred to a 20 liter bottle containing 12 liters of medium 3-9 sterilized at 120° C. for 1 hour. The vegetative inoculum is incubated at 28° C. for 72 hours with aeration at 0.5 liters of air per liter of medium per minute.

Second Stage 12 liters of first stage inoculum is introduced into a 400 liter tank fermentor containing 250 liters of inoculum medium 3-9 sterilized at 120° C. for 1 hour. The conditions for growth are 28° C., aeration at 0.6 liters of air per liter of mash per minute and agitation at 250 rpm. The growth period is usually 24 hours. Lard oil is added as an antifoam as needed.

D. Production of antibiotic AV290

Two hundred fifty liters of second stage inoculum is used to seed 2500 liters of medium 36-14 (2) in a 4,000 liter fermentor. The medium is sterilized at 120° C. for 1 hour. The fermentation is carried out at 28° C. with aeration at 0.8–1.0 liters of air per liter of mash per minute and with agitation at 150 rpm. Lard oil is added as an antifoam as needed. Maximum antibiotic yields are generally reached by 90 to 120 hours. The titer reaches the range of 1,500–3,000 $\gamma$ of antibiotic per ml.

| Fermentation Medium 36–14 (2) | |
| --- | --- |
| Glycerine | 30 gm./l. |
| Meat solubles | 12 gm./l. |
| Dipotassium hydrogen phosphate | 10 gm./l. |
| Calcium carbonate | 10 gm./l. |
| Sodium chloride | 5 gm./l. |
| Potassium chloride | 0.5 gm./l. |
| Magnesium sulfate heptahydrate | 0.5 gm./l. |

EXAMPLE 2

THE REFINING PROCESS

The refining process for antibiotic AV290 is:

A. Removal of the mycelium by filtration.

B. Ion exchange chromatography on CM-Sephadex C-25.

C. Adsorption chromatography on granular activated carbon.

The overall recovery in the refining process is about 25 percent. All pH adjustments are made with sulfuric acid and barium hydroxide to avoid the introduction of water-soluble inorganic ions that are difficult to remove since antibiotic AV290 is a water-soluble base that is not readily extracted into organic solvents.

A. Filtration of Harvested Mash

The harvested mash (2,000 liters, pH 7.25–7.4) is adjusted to pH 3 with sulfuric acid and 10 percent Hyflo Super-cel (w/v) is added. The solid is removed by filtration on a filter press and the cake is washed with water. The cake is discarded. The filtrate is adjusted to pH 6.0 with barium hydroxide. The barium sulfate that forms is removed by filtration with the aid of Hyflo Super-cel.

B. CM-Sephadex C-25 Column Chromatography

The culture filtrate is charged onto two 8¼ inch by 48 inch columns in parallel, each containing 4.4 kilograms (dry weight) of CM-Sephadex C-25 (H$^+$) that has been packed as a water slurry. The charge is fed by upward flow employing a pulsating pump at a flow rate of 1 liter/minute/column when on. The pulse rate is 30 seconds on, 90 seconds off. The columns are washed with water after the charge introduction.

The washed adsorbant is transferred to a 12 inch by 36 inch column and the antibiotic is eluted by downward flow by a series of acid gradients of the following composition:

1. Gradient of 60 liters of water + 60 liters of H$_2$SO$_4$ pH 2.
2. Gradient of 60 liters of H$_2$SO$_4$ pH 2 + 60 liters of H$_2$SO$_4$ pH 1.4.
3. 100–300 liters of H$_2$SO$_4$ pH 1.4.

The eluate is monitored by ultraviolet absorption at 280 nm and by a microbial agar diffusion assay method with *Corynebacterium xerosis* as the assay organism.

The fractions containing the antibiotic are pooled and concentrated under reduced pressure to about 75 liters. Any insoluble material is removed by filtration. The filtrate is adjusted to pH 6 with barium hydroxide and the barium sulfate formed is removed by filtration. The filter cake is washed with water. The filtrate plug washings are further concentrated to give a solution containing 50 mg. of solids per ml. The antibiotic is about 75 percent pure at this stage.

C. Granular Carbon Column Chromatography

The antibiotic is further purified by adsorption on a nine inch by 60 inch granular activated carbon column (19 kg. dry weight). The charge is introduced by gravity flow at a rate of 500 ml./minute. After the charge is on, the column is washed with 200 liters of water and then eluted with acetone/water (2:3). The eluate is assayed by ultraviolet absorption at 280 nm and by bioassay.

The selected fractions are combined and concentrated at reduced pressure to about 15 liters volume. The pH of the solution is adjusted to pH 4 with sulfuric acid and the solution is freeze-dried to give the final antibiotic AV290 sulfate product.

Alternatively, the antibiotic in the concentrated carbon eluate may be recovered by slowly adding the solution to 10 volumes of acetone with constant stirring. The precipitate is collected by filtration, washed with acetone and dried in a vacuum oven at 45° C.

We claim:

1. A process of recovering highly purified antibiotic AV290 sulfate from a fermentation whole harvest mash containing antibiotic AV290 which comprises the steps of:
    a. producing a fermentation liquor by clarifying the whole harvest mash,
    b. adjusting the pH of the fermentation liquor to about 6 with sulfuric acid,
    c. feeding the fermentation liquor to a bed of carboxymethyl substituted cross-linked dextran gel grains having an average diameter in the dry state within the range of from about 0.05 to about 0.5 mm., immersed in an aqueous medium, the said fermentation liquor being supplied to the bed in a volume corresponding to from about 0.1 gram to about 1.0 gram of antibiotic AV290 per gram of a dry gel,
    d. displacing liquid from the bed by the said fermentation liquor,
    e. thereafter feeding pH 1.4–2.0 aqueous sulfuric acid eluant to the bed to displace a further amount of liquid from the bed,
    f. collecting a fraction of the eluate containing antibiotic AV290 sulfate,
    g. adjusting the pH of the eluate fraction to about 6 with barium hydroxide,
    h. removing the precipitated barium sulfate,
    i. adsorbing the antibiotic activity onto granular activated carbon from the clarified eluate fraction,
    j. eluting the antibiotic activity from the granular activated carbon with acetone:water (2:3) solution, and
    k. isolating antibiotic AV290 sulfate from the acetone:water eluate;

steps (a) through (j) being carried out at a temperature of from about 15° C. to about 30° C.

2. A process according to claim 1 wherein the carboxymethyl substituted cross-linked dextran gel is a copolymerization product obtained from dextran having average molecular weights within the range of from about 5,000 to about 100,000 and epichlorohydrin, said gel also having a content of carboxymethyl groups of from 0.5 to 2.0 per anhydroglucopyranosic unit.

3. A process according to claim 1 wherein antibiotic AV290 sulfate is isolated from the acetone:water eluate by lyophilizing the eluate.

4. A process according to claim 1 wherein antibiotic AV290 sulfate is isolated from the acetone:water eluate by diluting the eluate with from about 5 to about 20 times its volume of acetone.

* * * * *